UNITED STATES PATENT OFFICE.

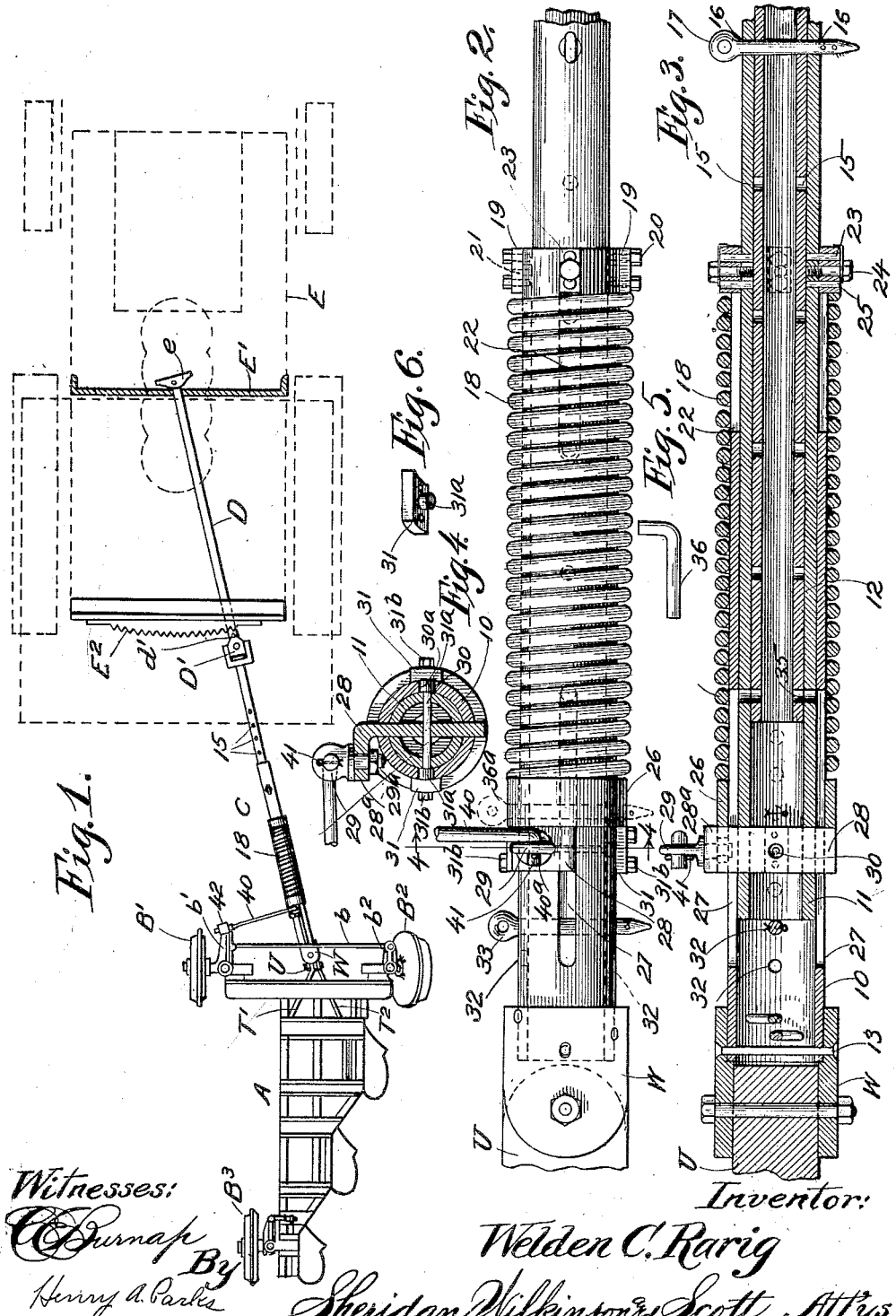

WELDEN C. RARIG, OF CORPUS CHRISTI, TEXAS.

DRAFT MECHANISM FOR EARTHWORKING IMPLEMENTS.

1,309,368.          Specification of Letters Patent.       Patented July 8, 1919.

Application filed June 18, 1914. Serial No. 845,853.

*To all whom it may concern:*

Be it known that I, WELDEN C. RARIG, a citizen of the United States, residing at Corpus Christi, in the county of Nueces and State of Texas, have invented certain new and useful Improvements in Draft Mechanism for Earthworking Implements, of which the following is a specification.

My invention relates in general to earth working implements, and in particular to an improved draft mechanism for connecting a plow or other such implement with the motive power, such, for instance, as a traction engine. My invention is more particularly adapted to be used as a substitute for the draft and steering mechanism shown and described in my Patent No. 1,094,018.

In plowing uneven ground, or soil in which there are roots, stumps, or rocks, the movement of the plow bodies is often suddenly retarded, thereby imposing such severe strains upon the plow and the draft mechanism connecting the same with the motive power that breakage frequently occurs. It is therefore desirable to interpose yielding draft mechanism between the plow and its motive power, so that sudden shocks and strains may be so dissipated as to avoid injury either to the plow or the draft mechanism.

It has also been found that when plowing hard ground, or ground covered with brush, roots, or stumps, the great resistance offered to the plow prevents the use of a gang of plow bodies having a combined furrow equal to the width of the traction engine, and it is therefore desirable to have the plow follow the engine at one side of the latter's path of movement in order that the engine may travel on the hard, unplowed surface. The plow or other implement when so arranged with respect to its motive power tends to aline longitudinally therewith during the forward movement thereof and to move toward a position at right angles thereto when the engine or motive power is backed. Either tendency varies in proportion to the resistance encountered by the plow during the corresponding movement of the engine and plow, and is very great when great obstacles, such as stumps, stones, or roots, are suddenly met with in the path of the plow. These conditions make it highly desirable to provide means for automatically maintaining the plow or other implement in proper alinement with its engine or motive power, and it is further advantageous to provide a means of the kind referred to which, when the engine is moved in either a forward or a backward direction, will be actuated in a degree proportional to the tendency which the plow has to move from its proper non-alining position.

The primary object of my invention is to provide an improved draft mechanism or "hitch" for plows which will permit a limited yielding when the plow is suddenly retarded, thereby avoiding sudden shocks or strains, and the consequent danger of breakage.

A further object of my invention is to provide an engine-propelled plow with an outwardly extending draft mechanism, so that when the plow bottoms engage obstructions, the elongation of the draft mechanism will vary the angle of draft, and thereby tend to free the plow bottoms from obstruction.

A further object of my invention is to provide an improved draft mechanism for plows which will permit a limited movement of the motive power relative to the plow both in pulling and backing the plow, or, when desired, will rigidly connect the motive power to the plow, so as to transmit thereto a non-yielding pull or push. Another object is to provide means for automatically maintaining the plow in proper position at one side of the path of travel of the engine when the engine is moving either forwardly or backwardly. Still another object is to provide means for maintaining the plow in proper position with respect to the engine's path of travel, which means will be actuated in proportion to the tendency of the plow to move from said position. A still further object of my invention is to provide an improved draft mechanism for plows which will be simple in construction, durable in use, and efficient in operation. Other objects will be set forth and made apparent hereinafter with reference to the accompanying drawings, in which my invention is illustrated as embodied in a convenient and practical form, and in which—

Figure 1 is a somewhat diagrammatic plan view illustrating my improved draft mechanism connecting the traction engine with a gang of plows.

Fig. 2 is an enlarged plan view showing the two outer telescoping members and other associated parts of my draft mechanism.

Fig. 3 is a vertical longitudinal section through the construction shown in Fig. 2.

Fig. 4 shows a detail sectional view, taken on the line 4—4 of Fig. 2.

Fig. 5 shows an elevation of a locking pin; and

Fig. 6 shows a perspective view of a stop for the sliding collar.

Like numerals and letters are used to designate the same parts in the several figures of the drawings.

Referring to Fig. 1, the letter A designates generally an engine-drawn plow which is supported upon front wheels B' and B² and the rear wheel B³, and connected by my improved draft mechanism with a traction engine, which is designated by the letter E. The front wheels B' and B² are supported by pivotal steering knuckles b' and b² which are connected to move in unison by a rod b. Secured to the forward portion of the plow frame are two converging draft bar connecting links T' and T², to which a clevis U is pivotally connected. This clevis is also pivotally connected by a vertically extending pin or bolt with the draft socket W, which is rigidy secured to the portion C of the draft mechanism. The forward portion of the draft mechanism comprises a drawbar D which is connected to the portion C by a universal joint D'. The drawbar is pivotally connected to the engine, preferably at a point substantially at the center thereof, and for this purpose the engine is provided with a central transverse frame member E', through which the forward end of the drawbar projects to form a rigid connection with the rocking bearing member e, whose curved surface is adapted to rock on the forward face of said frame member. The universal joint D' is provided with a wedge-shaped projection d' adapted to engage one of the teeth of the curved rack bar E² which is secured to the rear end of the engine frame.

Neither the plow nor the means for connecting the draft mechanism to the engine forms parts of my present invention, and they are shown merely as a basis for illustrating and describing a particular form of my improved draft mechanism. It will be understood that my invention is not restricted in its use to the connection of any particular form of propelling means with any particular earth-working implement, but it may be used with particular advantage in connecting plows with traction engines.

The portion C of the draft mechanism comprises three telescoping tubular draft members 10, 11, and 12, the outer one 10 of which engages the draft socket W and is secured thereto by pins or rivets 13 which pass through staggered pairs of diametrically opposed registering apertures in said engaging elements. The inner draft member 12 is secured at its forward end to the drawbar D through the universal joint D' above referred to, and is provided at various intervals longitudinally thereof with pairs of diametrically opposite apertures 15, which are located in the same plane passing through the longitudinal center line of said draft member. The pairs of apertures 15 in the draft member 12 are adapted to register with the apertures 16 in the intermediate draft member 11, and are engaged by an eye-bolt or pin 17. It will be apparent that by sliding the inner draft member within the draft member 11 the pin 17 may be inserted through a desired pair of apertures 15, whereby the draft mechanism may be adjusted to any preferred length.

The outer draft member 10 is surrounded by a coil spring 18, whose forward movement on said draft member is limited by the stops 19, which are secured to said member at opposite sides and near the forward end thereof by means of studs 20 and rivets 21. Extending rearwardly from the forward end of the draft member 10 on the upper and lower sides thereof are longitudinal slots 22; and stops or blocks 23, secured to the intermediate draft member by means of the studs 24 and pins 25, are adapted to project outwardly through said slots to engage the forward end of the coil spring 18.

At the rear end of the spring 18 the outer draft member is surrounded by a sliding collar 26. When in its normal position this collar is located approximately intermediate the ends of longitudinal slots 27 in the upper and lower walls of the draft member 10. A key 28 is adapted to pass through the slots 27 and engage the rear face of the collar 26. This key is provided with a transverse apertured head 28ª, engaged by an eye-bolt 29, which is retained in pivotal position on said head by means of a nut 29ª. The key is apertured approximately at the center line of said draft members, and is rigidly secured to the intermediate draft member by a pin 30, which engages the aperture in said key and diametrically opposed registering apertures in the walls of said draft member. The outer draft member is provided with diametrically opposite apertures 30ª, which aline with the pin 30 and which are adapted to be tightly engaged by lugs 31ª integrally formed on the inner faces of stops or blocks 31. The stops or blocks are apertured to be secured to the outer draft member 10 by studs 31ᵇ and are adapted to abut against the sliding collar 26 to prevent rearward movement thereof. The removal of the stops 31 will, of course, permit the ready insertion or withdrawal of the pin 30.

It will be apparent that by the means above described a resilient connection is made between the draft member 10 and the intermediate draft member 11 which may be rigidly secured to the inner draft member at 12 at various points longitudinally of said latter member. When a forward pull is exerted on the draft member 12, it will be apparent that the intermediate draft member 11 will slide within the outer draft member 10, thereby causing the spring 18 to be compressed as the key 28 moves forwardly in the slots 27, the forward sliding of the spring being limited by the stops 19. When a backward push is exerted upon the inner draft member, the key 28 will slide rearwardly within the slots 27, and at the same time the stops 23, which are secured to the intermediate draft member, will slide rearwardly in the slots 22, but the collar 26 will remain stationary since the backward movement thereof is limited by the stops 31. The backward sliding of the stops 23 in the slots 22 will, therefore, compress the spring 18 between said stops and the collar 26. It will, therefore, be apparent that a resiliency is provided in the draft mechanism for either a forward or backward movement of the motive power.

In order that the rearward sliding of the intermediate draft member may be limited, the outer draft member is provided, near the rear end thereof, with a series of registering apertures 32, through which a key or pin 33 may be inserted and retained in position by a cotter pin or other suitable means engaging apertures in the end of said pin. When the pin 33 is inserted in the position shown in the drawings, it will be apparent that a backward sliding of the intermediate draft member, when a backward push is exerted on the draft member 12, will be entirely prevented, while at the same time the forward sliding of the intermediate draft member against the compression of the spring 18 will not be interfered with. The backward sliding of the member 11 may be limited in various degrees by inserting the pin 33 in any desired pair of apertures 32.

In order that a non-yielding pull may be exerted upon the plow through the draft mechanism without interfering with the resilient yielding of the draft mechanism when a backward push is exerted thereon, the inner draft members 11 and 12 are provided with oppositely disposed registering apertures 35 which aline with the forward ends of the slots 27 and are adapted to be engaged by the pin or key 36 shown in Fig. 5. When this pin is inserted in the position described, it will be apparent that the resilient spring 18 will be without effect when a forward pull is exerted on the draft mechanism, for the reason that said pin engages the forward ends of the slots 27 before any relative movement of the draft members has taken place. When a backward push is exerted on the draft mechanism, however, the pin 36 will slide within the slots 27 in the same manner as the key 28. It may be particularly desirable to use the pin 36 in the above described manner in case the spring 18 is broken and cannot be readily repaired.

When it is desired to rigidly connect all of the sliding members of the draft mechanism, a pin 36$^a$ may be inserted through the horizontally extending alining apertures in the draft members 11 and 12, and the sliding collar 26. The use of the pin in this connection is shown at 36$^a$.

In order to provide means whereby the plow will be maintained at all times in its proper position relative to the path of the engine, or other motive power, I provide a steering link 40, whose hooked end 40$^a$ pivotally engages the eye-bolt 29 on the key 28, where it is secured in position by the cotter pin 41. The steering link 40 projects outwardly from the key and associated draft members, preferably substantially at right angles thereto, on the side thereof toward the path of the engine or motive power, and is pivotally secured at its outer end to the extremity of the steering knuckle $b'$, as shown at 42.

By virtue of the above described construction, it will be evident that the sliding of the key in the slots 27 will operate to turn the steering knuckles $b'$ on their vertical axes, thereby turning the forward portions of the peripheries of the inter-connected steering wheels B' and B$^2$ toward the furrow which was left by the plow on its last journey across the field. Thus, when the engine is moving forwardly, the key will slide forwardly within the slots 27, thereby compressing the spring 18, and at the same time pulling the steering knuckle $b'$ toward the longitudinal center line of the plow and causing the steering wheels to turn toward the furrow, thereby off-setting the natural tendency which the plow has to move toward a position in direct alinement with the center line of the engine. It will be obvious that the tendency of the plow to follow directly in the path of the engine will be proportional to the resistance encountered by the plow bottoms in the ground being plowed, and since the relative movement of the key in the slots 27 is proportional to the compression of the spring, it will be seen that I have provided means whereby the corrective influence resulting from the turning of the steering wheels is directly proportional to the tendency which the plow has to move from its proper position. It will further be apparent that a relative forward movement of the engine with respect to the plow will decrease the angle between the draft members and the longitudinal center line of the engine path, which, of course, will result in a sliding of the key in the slots 27 in order to adjust the steering link 40 to the changing distance between the point 42 and the key 28.

This resilient extensibility of the draft members also gives the engine a range of movement on solid ground when the plow is stationary. For instance, if the plow encounters an obstruction and is held stationary, the traction wheels do not slip around in one spot or spots, as would be the case if the draft mechanism were inextensible, but they advance forwardly, gripping the surface of the ground ahead of the position they occupied when the obstruction was encountered. This advantage can be increased in scope by adjusting the inner draft member 12 relatively to the intermediate draft member 10.

The resilient drawing mechanism also tends to vibrate the implement around obstructions which may be retarding it, owing to the fact that the actuation of the steering wheels facilitates the passing of the implement through or around the obstruction.

When the engine is backed, as is often necessary, particularly after the plow has encountered stumps or stones in its path, the wedge-shaped projection $d'$ of the universal joint $D'$ will engage a notch in the rack bar $E^2$, thereby holding the draft members in their proper position with respect to the engine path during the process of backing the engine; but it will be apparent that during this movement of the engine the forward portion of the plow will have a natural tendency to swing outwardly away from the engine path toward a position at right angles thereto. This tendency, however, is overcome by my improved draft mechanism, since when a backward push is exerted upon the draft member 12 of the key 28 the stops 23 will move backwardly in their corresponding slots, thereby tending to increase the distance between the key and the point 42 on the steering knuckle $b'$ and causing a turning of the steering knuckles $b'$ and $b^2$, which operates to direct the steering wheels $B'$ and $B^2$ toward the furrow. Thereafter as the backing of the engine is continued, the inclination of the steering wheels toward the furrow will operate to direct the plow toward a position behind the engine, thereby overcoming the natural tendency of the plow to swing toward a position alongside of the engine.

It will be apparent from the above description and explanation that I have provided an improved draft mechanism comprising a steering means which automatically operates to maintain the plow in its proper position with respect to the path of the engine during either a forward or backward movement of the engine, thus making it possible to run the engine on solid, unplowed ground at all times, and preventing the constant swaying of the plow, which, but for the use of my improved draft mechanism, would result in the leaving of sections or strips of unplowed ground adjacent the furrow left by the plow on its next preceding trip across the field. It is further evident that a use of my improved draft mechanism will prevent sudden shocks or strains upon the plow and engine in case obstructions are suddenly encountered in the path of the plow, or in case the engine is suddenly backed.

It will be understood, however, that I do not wish to be restricted to the particular form of draft mechanism or steering means herein described, nor to the use of said draft mechanism with the particular implement and propelling means shown and described, since I contemplate the use of my draft mechanism in other connections, as well as changes in form and construction of parts, and the omission of unnecessary elements as circumstances may suggest or necessity require, without departing from the spirit of my invention as embodied in the appended claims.

I claim:

1. The combination with a wheeled frame implement of draft mechanism connecting said implement with propelling means whereby said implement moves in a path at one side of the path of said propelling means, said draft mechanism comprising means for yieldingly transmitting pulling and pushing strains to said implement, and means actuated by said draft mechanism for maintaining said implement in the desired position with respect to the path of said propelling means.

2. The combination with a wheeled frame implement of draft mechanism connecting said implement with propelling means, said draft mechanism comprising two relatively movable members and a spring interposed between said members for yieldingly connecting them and means actuated by said draft mechanism for maintaining said implement in the desired position with respect to said propelling means.

3. The combination with a wheeled frame implement of draft mechanism connecting said implement with propelling means, said draft mechanism comprising two relatively movable members and a spring interposed between said members for yieldingly connecting them, means actuated by said draft mechanism for maintaining said implement in the desired position with respect to said propelling means, and means for rigidly connecting said members to eliminate the action of said spring.

4. The combination with a wheeled frame implement of draft mechanism comprising a plurality of relatively movable members and a spring interposed between two of said members for yieldingly connecting them, means actuated by said draft mechanism upon relative movement of said members for maintaining said implement in a desired position with respect to the path of said propelling means, and means for rigidly connecting two of said members at varying points to alter the length of said draft mechanism.

5. The combination with a wheeled frame implement of draft mechanism connecting said implement with propelling means, said mechanism comprising a resilient element to transmit yielding pulling strains to said implement and means to impart a direct nonyielding push to said implement, and means actuated by said mechanism for maintaining said implement in a desired position with respect to the path of said propelling means.

6. The combination with a wheeled frame implement, of draft mechanism connecting said implement with propelling means, whereby said implement moves in a path at one side of the path of said propelling means, said draft mechanism comprising resiliently connected movable members, and means actuated by said movable members to maintain said implement in the desired position relative to said propelling means.

7. The combination with a wheeled frame implement, of draft mechanism connecting said implement with a propelling means, whereby said implement moves in a path at one side of the path of said propelling means, said mechanism comprising slidably connected movable members, said draft mechanism also comprising steering means associated with the forward wheels of said implement, whereby when the propelling means is operated a movement of the movable members of the draft mechanism operates to steer said implement toward its proper position relative to said propelling means.

8. The combination with a wheeled frame implement, comprising steering wheels, of draft mechanism connecting said implement with a propelling means, said mechanism comprising resiliently connected movable members, and steering means operatively connected to said draft mechanism on the side thereof toward the longitudinal center line of the path of said propelling means, whereby a movement of said movable members when the propelling means is operated maintains said implement in the desired position with respect to the path of said propelling means.

9. The combination with a wheeled frame implement of draft mechanism for connecting said implement with propelling means, said draft mechanism comprising a pair of tubular members having telescopic engagement with each other, a coil spring surrounding said telescoping members, stops on one of said members to retain said springs thereon, projections on the other member to engage the ends of said spring, and means connecting said other member with the wheels of said implement for maintaining said implement in a desired position with respect to the path of said propelling means.

10. The combination with a wheeled frame implement of a propelling means, a tubular member connected to said propelling means, a second tubular member comprising a portion in telescopic engagement with said first-named member, a coil spring surrounding the telescoping part of said first-named member, stops carried by said first-named member to retain said spring thereon, projections on said first-named member having longitudinal slots therein through which said projections extend to engage the ends of said spring, and means adapted to slide in one of said slots and operatively connected to the wheels of said implement for directing said implement toward a path at one side of the path of said propelling means upon relative movement of said tubular members.

11. The combination with a wheeled frame implement of propelling means, two resiliently connected telescoping members connected to said implement, a third member telescoping with one of said first-named members and arranged to be detachably secured at varying points longitudinally thereof, and means for connecting one of said resiliently connected members to a forward wheel of said implement.

12. In a draft mechanism for connecting a wheeled frame implement with a propeling means, the combination with a member comprising a tubular portion, of a second member comprising a portion in telescopic engagement with said tubular portion of the first member, a coil spring surrounding said tubular portion, stops secured to said first member to limit one end of said spring, stops secured to said second member and extending through a longitudinal slot in said first member to abut against said end of said spring, a sliding collar around said tubular portion at the other end of said spring, a removable key adapted to be inserted through a slot in said tubular portion of the first member and secured to said second member adjacent one end thereof, and a steering rod connecting said key with a steering knuckle of said implement on the side of said draft mechanism toward the path of said propelling means.

13. The combination with a wheeled frame implement, of a propelling means for drawing said implement, draft mechanism